Oct. 17, 1961     R. A. MILLER     3,004,812
FLUID OPERATOR MECHANISM AND CONTROL ASSEMBLY THEREFOR
Filed April 16, 1958

INVENTOR
RICHARD A. MILLER
BY William R. Jacox
HIS ATTORNEY

United States Patent Office 3,004,812
Patented Oct. 17, 1961

3,004,812
FLUID OPERATOR MECHANISM AND CONTROL ASSEMBLY THEREFOR
Richard A. Miller, 115 Jay St., Dayton 10, Ohio
Filed Apr. 16, 1958, Ser. No. 729,012
8 Claims. (Cl. 311—6)

This invention relates to a fluid operator mechanism and control assembly therefor particularly, though not necessarily, adapted for actuation of a chiropractic table or the like.

An object of this invention is to provide fluid motor means adapted for operation of an adjustable chiropractic table, the motor means having a minimum number of moving parts.

Another object of this invention is to provide control means for operation of an adjustable chiropractic table.

Another object of this invention is to provide such a control unit and assembly which may be operated by a single switch unit.

Another object of this invention is to provide such a control unit and assembly which "fails safe."

Other objects and advantages reside in the construction of parts, the combination thereof, the method of manufacture, and the mode of operation, as will become more apparent from the following description.

Figure 1:
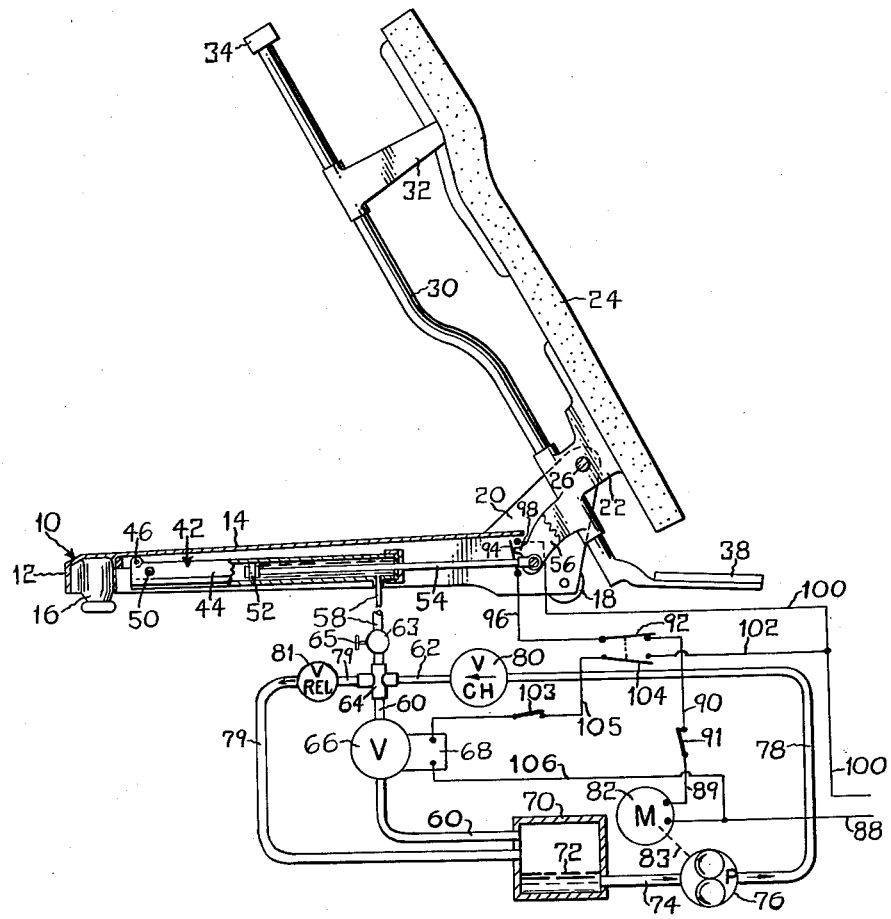

In the drawing: FIGURE 1 is a side elevational view, with parts broken away and with parts shown in section, of an adjustable chiropractic table showing schematically the fluid operator mechanism of this invention for the operation of the table.

Figure 2:
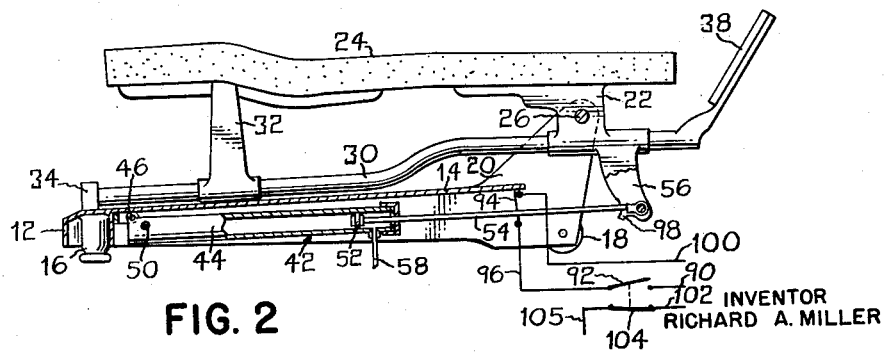

FIGURE 2 is a side elevational view of an adjustable chiropractic table with parts broken away and with parts shown in section. FIGURE 2 shows a portion of the operator assembly and shows the elements of the table in different relative positions from those shown in FIGURE 1.

Referring to the drawing in detail, any suitable chiropractic table is shown for operation by an operator assembly of this invention. The table comprises an elongate base 10 having side walls 12 and a floor 14. A plurality of leg members 16 and a plurality of wheel members 18 support the base 10. The leg members 16 are adjacent one end of the base 10 and the wheel members 18 are adjacent the opposite end of the base 10. Only one wheel member 18 and one leg member 16 is shown in each figure.

At the end of the base 10 adjacent the wheels 18 is an upwardly directed bracket member 20 to which is pivotally attached a leg 22 of a body support member or bed 24. A pin or bolt 26 is used for pivotally attaching the leg 22 to the bracket 20. The leg 22 is firmly attached to the body support member or bed 24 in any suitable manner. The leg 22 extends downwardly from the pin or bolt 26 and is firmly attached to a substructure 30 which extends somewhat parallel to the body support member or bed 24. A leg 32 attaches the bed or body support member 24 to the substructure 30 adjacent the opposite end thereof from the leg 22.

The bed or body support member 24 may consist of one section or a plurality of sections and is pivotally movable from an inclined vertical position, as shown in FIGURE 1, to a substantially horizontal position as shown in FIGURE 2. An engagement pad or block 34 of the substructure 30 engages the base 10 when the body support member 24 is horizontal, as shown in FIGURE 2. At the end of the substructure 30 opposite the engagement pad or block 34 is rigidly attached a stand or foot rest 38.

The operator mechanism of this invention includes a fluid motor 42 which is disposed below the floor 14 of the base 10 and comprises a hollow cylinder 44 which is closed at both ends thereof. A pin 46 pivotally attaches one end of the cylinder 44 to the base 10. Adjacent the pivotal end of the cylinder 44 is an aperture 50 which continuously provides communication between internal portions of the cylinder 44 and the atmosphere. Within the cylinder 44 is a piston 52 to which is attached a piston rod 54. The piston rod 54 slidably extends through the end of the cylinder 44 which is opposite the pivotal end thereof. The piston rod 54 is pivotally attached to an arm 56 of the substructure 30.

Also, adjacent the end of the cylinder 44 opposite the pivotal end thereof is a fluid conduit 58 which extends from the cylinder 44 and joins a connector 64 to which is attached a return conduit 60 and a supply conduit 62. Due to the fact that the cylinder 44 is pivotally movable, at least a portion of the conduit 58 is flexible. Within the conduit 58 is a valve 63 which has a manual operator 65.

A control valve 66, which is operated by means of an electric solenoid 68 is disposed in the return conduit 60. The control valve 66 is resiliently closed by any suitable spring means and the electric solenoid 68 must be energized for opening of the valve 66. The return conduit 60 connects to a reservoir 70 within which any suitable hydraulic fluid 72 is contained.

Also connecting to the reservoir 70 is an outlet conduit 74 which joins any suitable fluid pump 76. A discharge conduit 78 is connected to the outlet side of the pump 76 and joins the supply conduit 62 through a check valve 80. A pressure relief line 79 having a relief valve 81 therein joins the connector 64 to the reservoir 70.

A motor 82 which is preferably electric is mechanically connected to the pump 76, as shown by dashed lines 83. An electric conductor 88 is adapted to be connected to any suitable source of electrical energy and is electrically attached to the motor 82. The electric motor 82 also has a conductor 89 attached thereto which connects to a normally-closed switch 91. A conductor 90 connects the switch 91 in series with a switch 92. The electric switch 92 is connected to a limit switch 94 by means of a conductor 96. The limit switch 94 is mounted below the floor 14 of the base 10 at the portion thereof adjacent the wheels 18. The limit switch 94 is normally closed but is opened by engagement by a finger 98 of the arm 56.

Also connecting to the limit switch 94, at the opposite side thereof from the connector lead 96 is a conductor 100 which is adapted to connect to the source of electrical energy along with the conductor 88.

Attached to the conductor 100 is a connector lead 102 which is joined to a switch 104 which is mechanically attached to the switch 92. The switches 92 and 104 are so joined that when one of the switches is open, the other switch is closed. A connector lead 105 joins the switch 104 to a normally-closed switch 103 which is connected to one electrical side of the solenoid 68. The other side of the solenoid 68 is connected to the conductor 88 by means of a connector lead 106.

Operation

The chiropractic table may receive a patient as the body support member or bed 24 is in a vertically inclined position as shown in FIGURE 1. A patient steps onto the stand 38 and rests against the body support member 24. Then the operator of the table moves the unitary switches 92 and 104 from the position thereof shown in FIGURE 1 to the position thereof shown in FIGURE 2.

As shown in FIGURE 2, the switch 104 is closed when the switch 92 is open. When the switch 104 is closed, the solenoid 68 is energized so that the valve 66 is in an open position. With the valve 66 in an open position fluid may flow from the cylinder 44 to the reservoir 70 through the fluid conduits 58 and 60. The weight of the inclined body support member 24 with the substructure 30 therewith urges the piston rod 54 in a direction from the cylinder 44. The weight of the body support member 24 with the substructure 30 is sufficient, even without the weight of a person thereupon, to cause lowering movement when the valve 66 is open. Thus, when the valve 66 is open and fluid is permitted to flow from the cylinder 44 to the reservoir 70, the body support member 24 with the substructure 30 is permitted to pivotally move downwardly toward the base 10.

The rate of movement of the body support member 24 toward the base 10 is dependent upon the adjusted opening of the valve member 63. Thus, the body support member 24 with the substructure 30 moves at a controlled rate from the position thereof shown in FIGURE 1 to the position thereof shown in FIGURE 2. If, for any reason, it is desired to stop the movement of the body support member 24 at any position thereof during downward movement thereof, the switch 103 is opened. Opening of the switch 103 deenergizes the solenoid 68, closing the valve 66 and stops further flow of fluid from the cylinder 44. Further downward movement of the body support member 24 is thus permitted with closing of the switch 103.

As this downward pivotal movement occurs, the limit switch 94 is permitted to close as shown in FIGURE 2 and the piston rod 54 is extended from the position thereof shown in FIGURE 1 to the position thereof shown in FIGURE 2. During this time the piston 52, of course, moves toward the conduit 58.

When it is desired to again raise the body support member 24 to the position shown in FIGURE 1, the switch members 92 and 104 are moved to their positions as shown in FIGURE 1. In such positions, the switch 92 is closed while the switch 104 is open. Thus, the solenoid 68 is deenergized, closing the valve 66, and the motor 82 is energized. When the motor 82 is energized, the pump 76 is operated thereby so that fluid is pumped from the reservoir 70 through the conduits 74 and 78, through the check valve 80, and through the conduits 62 and 58. Rate of fluid flow into the cylinder 44 is governed by the adjusted opening of the valve 63.

If at any time during the pumping operation fluid pressure exceeds a predetermined value, the relief valve 81 permits flow of fluid to the reservoir 70.

Fluid flowing into the cylinder 44 through the conduit 58 forces the piston 52 to move in a direction away from the fluid conduit 58 so that the piston rod 54 forces the body support member 24 with the substructure 30 to pivotally move upwardly. If at any moment during the raising of the body support member 24, it is desired to stop movement thereof, the switch 91 is opened, deenergizing the motor 82. Upward movement of the member 24 is, of course, started again by closing of the switch 91. This upward pivotal movement continues as long as the switches 91 and 92 are closed and until the finger 98 of the arm 56 engages and opens the limit switch 94. When the limit switch 94 is open, as shown in FIGURE 1, the motor 82 is deenergized so that pumping operation stops.

With the switch 92 closed and the switch 104 open, the solenoid 68 is deenergized so that the valve 66 is closed. Thus, the control valve 66 and the check valve 80 hold fluid from flowing out of the cylinder 44. Therefore, while the switches 92 and 104 remain in positions shown in FIGURE 1, the body support member 24 is retained in the position thereof shown in FIGURE 1.

As the piston 52 causes movement of the body support member 24 from the position thereof shown in FIGURE 2 to the position thereof shown in FIGURE 1, the cylinder 44 pivotally moves as the piston rod 54 follows the movement of the arm 56.

Thus, it is understood that an adjustable chiropractic table with the operator mechanism of this invention for adjustment thereof is readily and easily operable and controlled. Due to the fact that the solenoid 68 must be energized in order to permit lowering movement of the body support member 24 from the position shown in FIGURE 1 to the position shown in FIGURE 2, the body support member 24 cannot fall or move if there is an inadvertent loss of electrical energy. In other words, the control system of this invention "fails safe."

The fluid motor means of this invention operates smoothly and quietly so that a patient resting upon the body support member 24 is not unnecessarily disturbed during pivotal movement thereof.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Mechanism for operation of an adjustable chiropractic table of the type having a base with a body support member pivotally attached thereto, comprising a fluid motor pivotally attached to the base, a fluid motor including a piston rod attached to the body support member, a fluid conduit connected to the fluid motor, a fluid pump connected to the fluid conduit, electric motor means for operation of the fluid pump, an electromagnetically operable valve connected in the fluid conduit between the fluid motor and the fluid pump, a source of electrical energy, a limit switch connected to the source of electrical energy and carried by the base, means carried by the body support member for opening the limit switch upon pivotal movement of the body support member to a given angular position, a control switch connected to the motor and to the limit switch, the electric motor means being connected to the source of electrical energy for energization thereof when the limit switch and the control switch are closed, a second control switch mechanically attached to the first said control switch and electrically connecting the electromagnetically operable valve to the source of electrical energy when the second control switch is closed, the valve being in open position when the second control switch is closed, a fluid conduit connecting the fluid pump to the fluid motor, and a check valve within the last said fluid conduit preventing flow of fluid from the fluid motor to the fluid pump.

2. Mechanism for operating an adjustable chiropractic table of the type having a base and a body support member pivotally attached thereto, the combination comprising a fluid motor including a cylinder pivotally attached to the base, a piston within the cylinder having a piston rod attached thereto and extending from an end of the cylinder, the piston rod being pivotally attached to the body support member, a first fluid conduit, the first fluid conduit connecting to the cylinder adjacent the end thereof through which the piston rod extends, a return conduit connected to the first fluid conduit, a reservoir attached to the return conduit, a control valve in said return conduit between the first conduit and the reservoir, a fluid pump, a supply conduit joining the reservoir to the fluid pump, a discharge conduit joining the fluid pump to the first conduit, a check valve in said discharge conduit between the pump and the first conduit, an electric motor mechanically coupled to the pump for operation thereof, an electromagnetic solenoid connected to the control valve for opening operation thereof, a normally closed limit switch mounted on the base and engageable by a portion of the body support member for opening thereof upon pivotal movement of the body support member to a given angular position, a source of electrical energy, first switch means, the first switch means connecting the solenoid to the source of electrical energy, and second switch means, the second switch means connecting the motor to a source of electrical energy, said first and second switch means being mechanically interconnected so that when the first switch means is open the second switch means is closed and the second switch means is open when the first switch means is closed.

3. A control assembly for an adjustable chiropractic table, the table being of the type having a stationary portion and a movable portion, the control assembly comprising a reciprocally operable fluid motor pivotally attached to one of the portions of the table, the fluid motor having a piston rod attached to the other portion of the table, a fluid conduit connected to the fluid motor and extending therefrom, a return conductor connected to the fluid conduit, a reservoir also connected to the return conductor, a normally closed control valve connected to the return conductor between the fluid conduit and the reservoir, an electric operator attached to the control valve for opening thereof, a discharge conductor leading from the reservoir to the fluid conduit, a fluid pump within the discharge conductor between the reservoir and the fluid conduit, an electric motor connected to the fluid pump for operation thereof, a source of electrical energy, and control means electrically connected to the source of electrical energy and to the electric operator and to the electric motor, the control means including means energizing the electric operator while deenergizing the electric motor and deenergizing the electric operator while energizing the electric motor.

4. A control assembly for an adjustable chiropractic table, the table having a stationary portion and a pivotal portion, the control assembly comprising a reciprocally operable fluid motor pivotally attached to the stationary portion of the table, the fluid motor having a piston rod pivotally attached to the pivotal portion of the table, a fluid conduit connected to the fluid motor and extending therefrom, a return conductor connected to the fluid conduit, a reservoir also connected to the return conductor, a valve connected in the return conductor between the fluid conduit and the reservoir, a discharge conductor leading from the reservoir to the fluid conduit, a fluid pump within the discharge conductor between the reservoir and the fluid conduit, an electric motor connected to the fluid pump for operation thereof, a source of electrical energy, and control means electrically connected to the source of electrical energy and to the electric motor.

5. An actuator assembly comprising a fluid motor having a reciprocally operable piston rod, a fluid conduit connected to the fluid motor and extending therefrom, a return conduit having an end connected to the fluid conduit, a reservoir connected to the other end of the return conduit, a normally closed control valve within the return conduit between said fluid conduit and the reservoir for controlling flow of fluid from the fluid conduit to the reservoir, an electric operator attached to the control valve for opening thereof, a discharge line leading from the reservoir to said fluid conduit, a fluid pump connected within the discharge line between the reservoir and the fluid conduit for pumping fluid from the reservoir to the fluid conduit, an electric motor connected to the fluid pump for operation thereof, a source of electrical energy, and control means electrically connected to the source of electrical energy and to the electric operator and to the electric motor, the control means including means energizing the electric operator while deenergizing the electric motor and deenergizing the electric operator while energizing the electric motor.

6. An operator assembly comprising a fluid motor including a hollow cylinder, a piston within the cylinder and having a piston rod attached thereto and extending from an end of the cylinder, a first fluid conduit, the first fluid conduit connecting to the cylinder adjacent the end thereof through which the piston rod extends, a reservoir, a return conduit line connecting the first fluid conduit to the reservoir, a control valve in said return conduit line between the first conduit and the reservoir, a fluid pump, a supply conduit joining the reservoir to the fluid pump, a discharge conduit joining the fluid pump to the first conduit, an electric motor mechanically coupled to the pump for operation thereof, an electromagnetic solenoid connected to the control valve for operation thereof, a normally closed limit switch adjacent the piston rod and operable thereby for limiting the movement of the piston rod, a source of electrical energy, first switch means, the first switch means connecting the solenoid to the source of electrical energy, and second switch means, the second switch means connecting the motor to a source of electrical energy, said first and second switch means being mechanically interconnected so that when the first switch means is open the second switch means is closed and the second switch means is open when the first switch means is closed.

7. An operator mechanism comprising a fluid motor having a reciprocally movable piston rod, a fluid conduit connected to the fluid motor, a fluid pump connected to the fluid conduit, electric motor means for operation of the fluid pump, a source of fluid, fluid conductor means connecting the fluid motor to the fluid pump and connecting the fluid pump to the source of fluid, an electromagnetically operable valve connected in the fluid conductor between the fluid motor and the source of fluid, a source of electrical energy, switch means operable by the fluid motor for limiting the amount of movement of said piston rod with respect to the motor, a control switch connected to the electric motor means and to said switch means, the electric motor means being connected to the source of electrical energy for energization thereof when the switch means and the control switch are closed, a second control switch mechanically connected to the first control switch and electrically connecting the electromagnetically operable valve to the source of electrical energy when the second control switch is closed, the valve being in open position when the second control switch is closed, a fluid conduit connecting the fluid pump to the fluid motor, and a check valve within the last said fluid conduit preventing flow of fluid from the fluid motor to the fluid pump.

8. Mechanism for operation of an adjustable chiropractic table having an elongate inverted shell shaped base, a body support member pivotally attached to one end of the base, the combination comprising a hollow cylinder closed at the ends thereof and disposed within the shell shaped base, the cylinder having an end thereof pivotally attached to the base adjacent the end thereof opposite the end to which the body support member is pivotally attached, a piston within the cylinder and having a piston rod extending through an end thereof, the piston rod being pivotally attached to the support member adjacent the pivotal connection of the support member to the base, a fluid conduit connecting to the cylinder adjacent one end thereof, and fluid control means connected to the fluid conduit for controlling flow of fluid therethrough.

References Cited in the file of this patent

UNITED STATES PATENTS

| | | |
|---|---|---|
| 1,228,953 | Naysmith | June 5, 1917 |
| 1,440,155 | Junkin | Dec. 26, 1922 |
| 1,671,193 | Koenigkramer | May 29, 1928 |
| 1,853,096 | Stukenborg | Apr. 12, 1932 |
| 1,989,434 | Thompson | Jan. 29, 1935 |
| 2,063,122 | Richardson | Dec. 8, 1936 |
| 2,091,014 | Saak | Aug. 24, 1937 |
| 2,217,783 | Bell | Oct. 15, 1940 |
| 2,253,112 | Boysson | Aug. 19, 1941 |
| 2,267,054 | Thompson | Dec. 23, 1941 |
| 2,429,834 | Madden et al. | Oct. 28, 1947 |
| 2,520,455 | Clachko | Aug. 29, 1950 |
| 2,520,849 | McVicker | Aug. 29, 1950 |
| 2,568,236 | Kizaur | Sept. 18, 1951 |
| 2,571,829 | Buckley | Oct. 16, 1951 |
| 2,582,565 | Schnippel et al. | Jan. 15, 1952 |
| 2,636,348 | Murray | Apr. 28, 1953 |
| 2,851,320 | Lorang | Sept. 9, 1958 |